April 30, 1968     O. PITRE     3,380,787
JOURNAL PROTECTOR
Filed Sept. 15, 1965
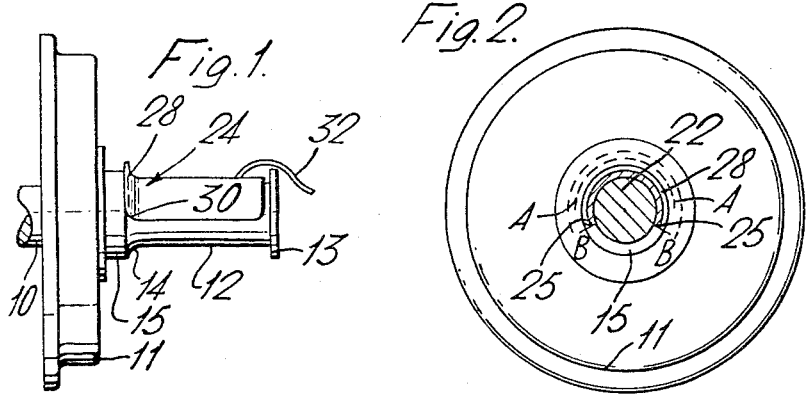
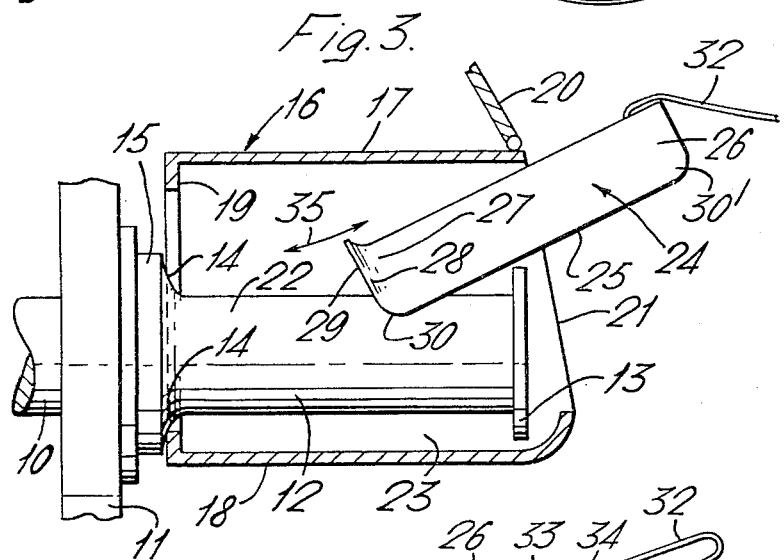
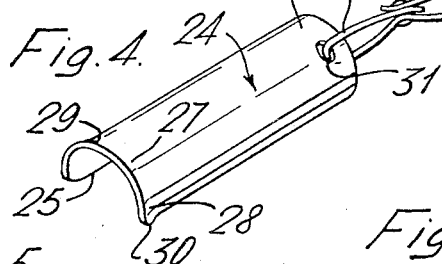
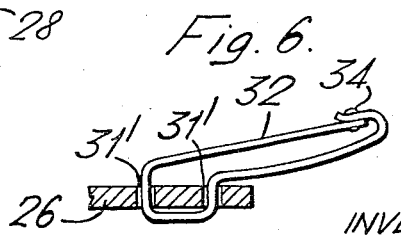
INVENTOR
OLIVER PITRE
BY
ATTORNEY

United States Patent Office 3,380,787
Patented Apr. 30, 1968

3,380,787
JOURNAL PROTECTOR
Oliver Pitre, 512 Kildare Ave. E., Transcona,
Manitoba, Canada
Filed Sept. 15, 1965, Ser. No. 487,389
3 Claims. (Cl. 308—1)

ABSTRACT OF THE DISCLOSURE

The device is a resilient semi-cylindrical member made of plastic or the like which can be snapped upon the wheel journal of a railroad truck to protect the journal while the bearings are being removed or replaced from the railroad truck.

---

This invention relates to new and useful improvements in journal protectors for railroad wheel journals.

The construction of railroad coaches and freight cars includes a pair of truck sides carrying journal boxes which are engaged over extending journal bearings upon each side of the truck wheels.

The journal bearing is situated between the upper side of the journal box and the wheel journal and is held in place by the weight of the freight car and prevented from endwise movement by a flange upon the end of the wheel bearing.

Situated beneath the wheel baring and within the journal box is the conventional lubricating pad.

When it is desired to work upon the wheel journals, the truck side is jacked upwardly, the journal bearing is removed, and the truck sides are lowered slightly and withdrawn from the journal bearings.

Assembly is a reversal of the above and it is during the assembly and disassembly of the truck sides that damage is likely to occur to the highly burnished surface of the wheel journal.

My protector comprises a resilient segmentally cylindrical member which is adapted to be snapped upon the wheel journal after the truck sides have been elevated and the journal bearing removed whereupon the truck side can be withdrawn from the wheel journals.

After the truck sides have been re-assembled over the wheel journals, the member can be snapped off the wheel journals and the assembly of the journal bearings and lubricating pads can continue.

The principal object and essence of the invention is therefore to provide a device of the character herewithin described which is adapted to be placed upon the major upper portion of a wheel journal to protect same while the truck sides are assembled and disassembled therefrom.

Another object of the invention is to provide a device of the character herewithin described which protects the wheel journals against damage while maintenance work is being carried out thereupon.

A still further object of the invention is to provide a device of the character herewithin described in which the inherent resiliency of the protectors holds same clipped to the journal bearings.

A still further object of the invention is to provide a device of the character herewithin described in which the shape of the inner end facilitates the installation of the protectors prior to the withdrawal of the truck sides from the journals.

Still another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of a wheel and journal in section with my protector in position.

FIGURE 2 is an end view of FIGURE 1.

FIGURE 3 is an enlarged view showing the journal box in section and my device being installed upon the journal bearing.

FIGURE 4 is an isometric view of the journal protector enlarged with respect to FIGURES 1 and 2.

FIGURE 5 is an alternative embodiment of my invention particularly suitable for use upon journals after removal of the truck sides.

FIGURE 6 is a fragmentary sectional view showing an alternative method of strap attachment.

In the drawings like characters of reference indicate corresponding parts in the different figures.

Proceeding therefore to describe the invention in detail, reference character 10 illustrates a conventional freight car wheel axle having a freight car wheel 11 secured thereon and a cylindrical journal 12 extending outwardly upon the opposite side to the axle 10. This journal is cylindrical and is provided with end flange 13 and inner radius 14. The inner radius connects the journal 12 to the cylindrical attaching portion 15 secured to the wheel 11.

A journal box collectively designated 16 forms part of the truck side (not illustrated) and includes the upper side 17, base 18, inner apertured end 19, and sloping hinged cover 20 adapted to cover the open outer end 21 in normal circumstances.

The journal bearing (not illustrated) is normally situated upon the upper segment 22 of the journal and within the journal box 16 and the lubricating pad (not illustrated) normally resides within the lower area 23 of the journal box.

My invention collectively designated 24 is made of resilient plastic and preferably laminated Fiberglas reinforced with plastic.

In cross sectional configuration it is a segmentally cylindrical section having lower side edges 25, outer end 26 and inner end generally designated 27.

The circumferential distance between the edges 25 is greater than half of the circumferential distance of the journal which it is designed to protect.

These distances are illustrated in FIGURE 2, the distance A—A representing half of a cylindrical distance of the journal and the distance B—B representing the circumferential distance between side edges 25.

Due to the inherent resiliency of the protector, it will be appreciated that when in position upon the journal, it is snapped into position and is held against inadvertent displacement due to the fact that it embraces the major portion of the journal.

The aforementioned inner end 27 is outwardly curved as at 28 giving an inner flared circumferential area 29 which is adapted to engage the radius 14 between the journal 12 and the attaching cylindrical portion 15 hereinbefore described.

Also of importance are the outwardly curved corners 30 between the flared circumferential end 29 and the side edges 25 which facilitate the installation of the device upon the journal. The other corners 30′ are also curved or rounded to facilitate the removal of the protector and prevent these corners from binding on the flange 13.

An aperture 31 is formed through the protector adjacent the outer end 26 thereof and substantially upon the crown of the protector and a flexible strap 32 is provided, the inner end 33 passing through the slot 31 to the underside of the protector and thence around to form a loop. The ends are connected to the main portion of the strap approximately centrally thereof, by rivet 34 thus forming a double loop as shown in FIGURE 4.

FIGURE 6 shows an alternate arrangement of the strap 32 in which a pair of apertures 31' are provided in the protector. The strap passes through both of these apertures and then is secured by the ends thereof by means of rivet 34. The apertures 31' being smaller than the ends and rivet, prevent the rivet 34 from passing through either of the apertures to the underside of the protector where it might damage the bearing.

In operation, the truck sides are elevated to the position shown in FIGURE 3 with relation to the journal 12 whereupon the journal bearing (not illustrated) is removed over the flange 13.

The protector is then inserted through the end 21 of the journal box 16 at an angle as illustrated in FIGURE 3 and the outwardly curved corners 30 facilitate the engagement of the inner end over the journal.

The protector is moved inwardly in the direction of arrow head 35 so that it engages and embraces the journal and takes up the position shown in FIGURE 1 whereupon the truck sides and journal boxes may be removed from the journals.

Assembly is a reversal of the foregoing and when the truck sides and journal boxes are assembled in the position shown in FIGURE 3, the sharp pull upon the strap 32 disengages the journal protector from the journal 12 so that it may be removed through the open end 21 of the journal box.

FIGURE 5 shows a cylindrical journal protector 36 in which the side edges 37 overlap one another due to the resiliency of the material forming the protector.

These may be opened and engaged over a cylindrical journal thus covering the entire journal for protection purposes.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

I claim:

1. A device for protecting a railroad car axle journal against damage while a journal box is being removed from or applied to the journal, said protecting device comprising an elongated substantially semi-cylindrical shield conforming substantially to the peripheral surface of a journal to be protected, said shield being formed from resiliently flexible material which inherently biases opposite longitudinal side portions of the shield toward each other, whereby to frictionally retain the shield in position on a journal.

2. The device as defined in claim 1 wherein the cross-section of said shield subtends an arc of more than 180° but less than 360°.

3. The device as defined in claim 1 together with a flexible strap loop connected to one end portion of said shield and affording a handle therefor.

References Cited

UNITED STATES PATENTS

| | | | |
|---|---|---|---|
| 1,185,963 | 6/1916 | Armstrong | 138—96 |
| 1,255,463 | 2/1918 | Raymond | 138—96 |
| 1,340,808 | 5/1920 | Urbieta. | |
| 1,847,391 | 3/1932 | Fisher | 138—96 |
| 2,253,729 | 8/1941 | Schuetz | 138—96 |
| 2,266,300 | 12/1941 | Bebinger | 308—245 X |
| 2,856,642 | 10/1958 | Rogner | 308—245 X |

FREDERICK L. MATTESON, JR., *Primary Examiner.*

ROBERT A. DUA, MARTIN P. SCHWADRON,
*Examiners.*